(12) United States Patent
Wang et al.

(10) Patent No.: US 12,529,816 B2
(45) Date of Patent: Jan. 20, 2026

(54) REDUCTION OF A TOOL WAVE EXCITED BY A TRANSMITTER OF A WELL LOGGING TOOL

(71) Applicant: Halliburton Energy Services, Inc., Houston, TX (US)

(72) Inventors: Ruijia Wang, Singapore (SG); Jing Jin, Singapore (SG); Yao Ge, Singapore (SG)

(73) Assignee: Halliburton Energy Services, Inc., Houston, TX (US)

( * ) Notice: Subject to any disclaimer, the term of this patent is extended or adjusted under 35 U.S.C. 154(b) by 352 days.

(21) Appl. No.: 18/361,324

(22) Filed: Jul. 28, 2023

(65) Prior Publication Data

US 2024/0094422 A1     Mar. 21, 2024

Related U.S. Application Data

(62) Division of application No. 16/610,062, filed as application No. PCT/US2019/013525 on Jan. 14, 2019, now Pat. No. 11,774,619.

(51) Int. Cl.
*G01V 1/50*     (2006.01)
*G01V 1/46*     (2006.01)

(52) U.S. Cl.
CPC ............... *G01V 1/46* (2013.01); *G01V 1/50* (2013.01); *G01V 2210/127* (2013.01); *G01V 2210/54* (2013.01)

(58) Field of Classification Search
CPC ...... G01V 1/46; G01V 1/50; G01V 2210/127; G01V 2210/54
See application file for complete search history.

(56) References Cited

U.S. PATENT DOCUMENTS

| | | | |
|---|---|---|---|
| 4,796,237 A | * | 1/1989 | Hutchens ................ G01V 1/46 367/27 |
| 4,858,718 A | | 8/1989 | Chelminski |

(Continued)

FOREIGN PATENT DOCUMENTS

WO     2020149826     7/2020

OTHER PUBLICATIONS

PCT Application Serial No. PCT/US2019/013525, International Search Report, mailed Oct. 14, 2019, 3 pages.

(Continued)

*Primary Examiner* — Krystine E Breier
(74) *Attorney, Agent, or Firm* — DeLizio, Peacock, Lewin & Guerra LLP

(57)     ABSTRACT

Enclosed herein are a method and system for reduction of a tool wave excited by a transmitter of the well logging tool. In one embodiment, a method comprises transmitting, by a primary transmitter, a primary acoustic wave into a geologic formation which excites a tool wave and a formation wave in the geologic formation, wherein the logging tool comprises a tool wave propagating factor which is different from a formation wave propagating factor; receiving, by one or more receivers, the formation wave and the tool wave; propagating waveform data associated with the received tool wave and formation wave based on a distance between the auxiliary receiver and a primary receiver; and reducing the tool wave in waveform data associated with the formation wave and the tool wave received by a primary receiver of the one or more receivers based on the propagated waveform data.

14 Claims, 12 Drawing Sheets

(56) References Cited

U.S. PATENT DOCUMENTS

| | | | |
|---|---|---|---|
| 5,331,604 A | 7/1994 | Chang et al. | |
| 9,443,504 B2 * | 9/2016 | Pabon | G10K 11/17857 |
| 10,809,406 B2 * | 10/2020 | Zhao | E21B 47/017 |
| 2004/0238266 A1 | 12/2004 | West et al. | |
| 2005/0167101 A1 | 8/2005 | Sugiyama | |
| 2009/0230969 A1 * | 9/2009 | Hall | G01V 11/002 |
| | | | 324/343 |
| 2010/0080081 A1 * | 4/2010 | Morgan | G01V 1/006 |
| | | | 367/37 |
| 2012/0037423 A1 | 2/2012 | Geerits et al. | |
| 2014/0192618 A1 * | 7/2014 | Pabon | G10K 11/17857 |
| | | | 367/34 |
| 2018/0003846 A1 * | 1/2018 | Wago | G01V 1/50 |
| 2020/0072036 A1 | 3/2020 | Wang | |
| 2021/0349229 A1 | 11/2021 | Wang et al. | |

OTHER PUBLICATIONS

PCT Application Serial No. PCT/US2019/013525, International Written Opinion, mailed Oct. 14, 2019, 8 pages.

PCT Application Serial No. PCT/US2019/013525; IPRP; Jul. 29, 2021, 9 pages.

"U.S. Appl. No. 16/610,062, Non-Final Office Action", Jan. 18, 2023, 11 pages.

"U.S. Appl. No. 16/610,062, Restriction Requirement", Sep. 15, 2022, 6 pages.

Kinoshita, et al., "Feasibility and Challenge of Quantitative Cement Evaluation With LWD Sonic", Society of Petroleum Engineers, SPE 166327, Jan. 1, 2013 00:00:00.0, 10 pages.

Pistre, et al., "Attenuation-Based Quantitative Cement Bond Index with LWD Sonic: A Novel Approach Applicable to all Casing and Cement Cases", Society of Petroleum Engineers, SPE-170886-MS, Jan. 1, 2014 00:00:00.0, 18 pages.

\* cited by examiner

REDUCTION OF A TOOL WAVE EXCITED BY A TRANSMITTER OF A WELL LOGGING TOOL

CLAIM OF PRIORITY

This application is a continuation of and claims priority to U.S. application Ser. No. 16/610,062, filed Oct. 31, 2019, the entire contents of which are incorporated herein by reference.

TECHNICAL FIELD

This disclosure relates generally to well logging tools which record properties of a geologic formation and more particularly to reduction of a tool wave excited by a transmitter of the well logging tool.

BACKGROUND ART

Well logging tools record properties of a geologic formation. They have a transmitter for transmitting an acoustic wave into the geologic formation and a receiver for receiving a formation wave from the geologic formation. The formation wave indicates properties of the formation, including presence of hydrocarbon in the formation and condition of cement which lines a borehole in the geologic formation. When the acoustic wave is transmitted, a tool wave is excited along the sonic tool, from the transmitter to the receiver. The tool wave interferes with reception of the formation wave by the receiver.

BRIEF DESCRIPTION OF THE DRAWINGS

Embodiments of the disclosure may be better understood by referencing the accompanying drawings.

Figure 1:
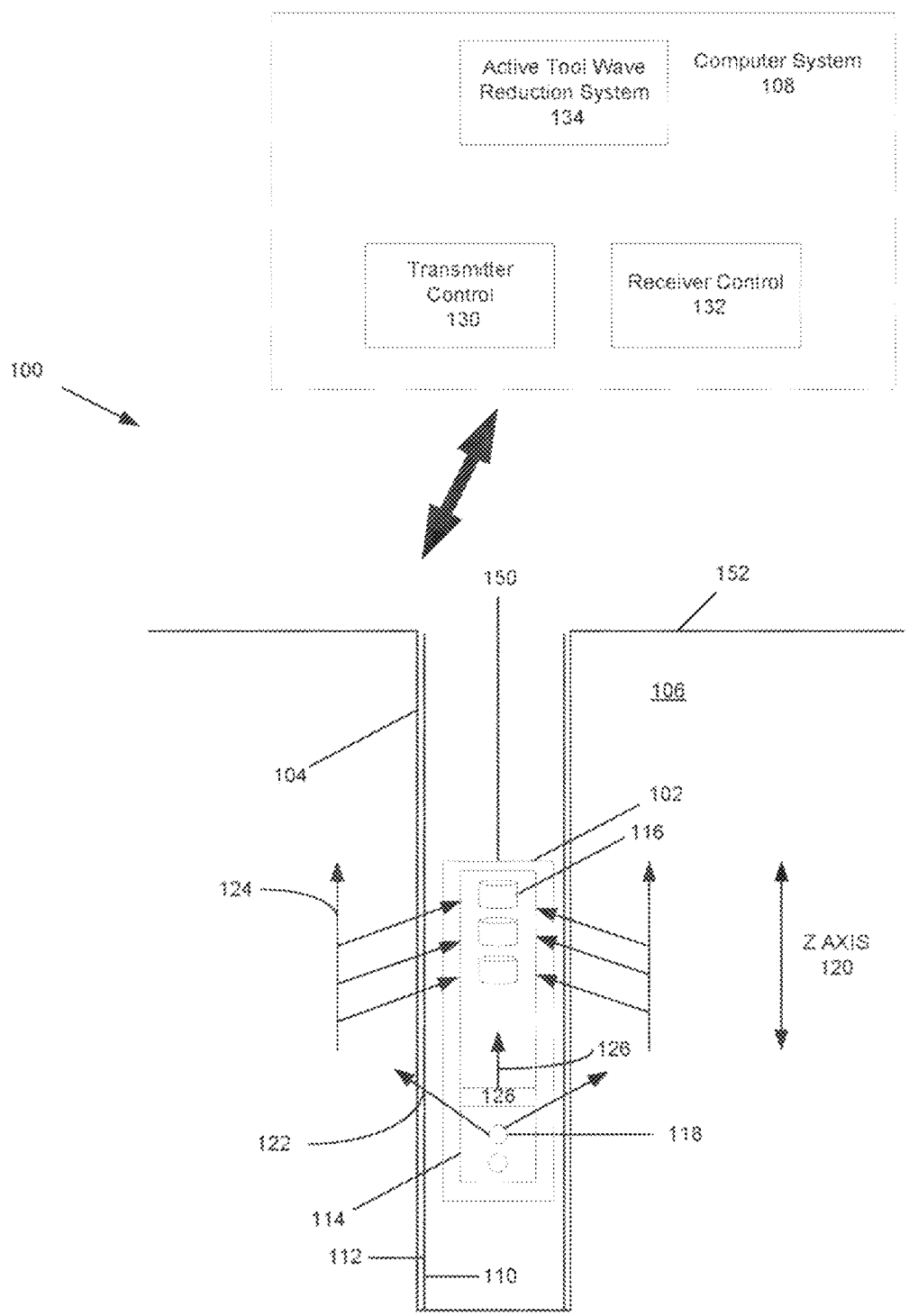
FIG. 1 illustrates a system for active tool wave reduction.

The drawings are for the purpose of illustrating example embodiments, but it is understood that the embodiments are not limited to the arrangements and instrumentality shown in the drawings.

DESCRIPTION OF EMBODIMENTS

The description that follows includes example systems, methods, techniques, and program flows that embody aspects of the disclosure. However, it is understood that this disclosure may be practiced without these specific details. For instance, this disclosure refers to reducing a tool wave excited by a transmitter of a well logging tool positioned in a borehole of a geologic formation in illustrative examples. Aspects of this disclosure can be applied to reducing other types of waves excited by other types of tools in the borehole or other environments. In other instances, well-known instruction instances, protocols, structures and techniques have not been shown in detail in order not to obfuscate the description.

Overview

Tool wave reduction is a process of reducing a tool wave received by a receiver of a well logging tool when a transmitter of the logging tool transmits an acoustic wave into a geologic formation. Various techniques exist for reducing the tool wave. One example is to add slotted sleeves, grooved collars, and other attenuation components to the well logging tool to sonically isolate the transmitter and the receiver to reduce the tool wave that reaches the receiver. The addition of slotted sleeves, grooved collars, and other attenuation components compromise strength of the logging tool and a depth range of the logging tool. Another example is to apply an array filter to a signal received by the receiver. The signal includes the tool wave and a formation wave. The signal is converted from a space-time domain to a wavenumber frequency domain (F-K domain) and filtered by the array filter to reduce the tool wave. The array filter outputs the formation wave which is converted back to the space-time domain. In many cases, however, the array filter will not be able to adequately filter the tool wave from the formation wave if formation wave slowness is close to tool wave slowness.

Embodiments described herein are directed to actively reducing a tool wave received by a receiver of a well logging tool based on a transmitter of the well logging tool transmitting an acoustic wave into the geologic formation. The well logging tool (also referred to as logging tool) has a tool mandrel with one or more transmitters and one or more receivers. The one or more transmitters may transmit an acoustic wave which excites the tool wave and a formation wave. The formation wave may include one or more of compressional waves, shear waves, and/or guided waves propagating along the borehole wall excited by the acoustic wave. The tool wave includes one or more waves propagating directly along a body of the logging tool (e.g., not propagating in the geologic formation) also excited by the acoustic wave. The tool mandrel has a tool wave propagating factor different from a formation wave propagating factor to facilitate reducing the tool wave. The tool wave is reduced via a transmitter approach and/or a receiver approach.

In the transmitter approach, the one or more transmitters each transmit an acoustic wave with phases and/or amplitudes that collectively cause the tool wave received by the one or more receivers to be reduced. For example, the primary transmitter may transmit an acoustic wave which excites a formation wave in the formation and a tool wave in the tool mandrel. At a same time the primary transmitter transmits the acoustic wave, one or more auxiliary transmitters each transmit an acoustic wave with phases and/or amplitudes that excite an inverse phase to the tool wave in the tool mandrel. The inverse phase to the tool wave reduces the tool wave excited by the primary transmitter and tool wave received by the one or more receivers.

In the receiver approach, the one or more receivers may receive both the formation wave and tool wave. The tool wave may be separated the formation wave and the formation wave output. A primary receiver of the one or more receivers and one or more auxiliary receivers each receives the tool wave and formation wave and converts the received tool wave and formation wave into respective waveform data. The waveform data from each of the auxiliary receivers may be used to estimate an inverse phase of the tool wave in the waveform data associated with the primary receiver. The estimate may be generated by backpropagating the waveform data associated with each of the auxiliary receivers based on a position of the primary receiver. Then, the tool wave in the waveform data associated with the primary receiver may be removed based on the estimated inverse phase of the tool wave.

The description that follows includes example systems, apparatuses, and methods that embody aspects of the disclosure. However, it is understood that this disclosure may be practiced without these specific details. In other instances, well-known instruction instances, structures and techniques have not been shown in detail in order not to obfuscate the description.

Example Illustrations

FIG. 1 illustrates a system 100 for active tool wave reduction. The system 100 includes a well logging tool 102 (also referred to as logging tool 102) that can be raised and lowered in a borehole 104 drilled in a geologic formation 106 via a conveyance 150 such as a wireline including but not limited to a wireline slickline, coiled tubing, piping, downhole tractor, or a combination thereof, or logging while drilling (LWD) apparatus conveyed on a bottom hole assembly. The system 100 also includes a computer system 108 located at the surface 152 of the geologic formation 106 or downhole.

The borehole 104 may be lined with a casing 110 such as steel tubing surrounded by cement 112 which fills an annulus between the borehole 104 and casing 110. The casing 110 serves multiple purposes. The casing 110 prevents the borehole 104 from caving in, keeps hydrocarbon carried within the casing 110 from escaping out of the casing 110, and prevents unwanted fluids such as water outside of the casing 110 from entering into the casing 110 and contaminating the hydrocarbon carried within the casing 110.

A tool mandrel 114 of the logging tool 102 has one or more transmitters 118 and one or more receivers 116 along a longitudinal z axis 120 of the logging tool 102. The one or more transmitters 118 may transmit an acoustic wave 122 which excites a formation wave 124 in the geologic formation 106 and/or tool wave 126 in the tool mandrel 114. The formation wave 124 may include one or more of compressional waves, shear waves, and/or guided waves propagating along the wall of the borehole 104 excited by the acoustic waves 122. The tool wave 126 is a wave propagating directly along the tool mandrel 114 (e.g., not propagating in the geologic formation 106) also excited by the acoustic wave 122. The tool mandrel 114 and/or a body of the logging tool 102 may also have structure to slow down the tool wave 126 with respect the formation waves 124. The structure 128 may include one or more of cuttings, holes, grooves of the tool mandrel 114 which causes a tool wave propagating factor to be different from a formation wave propagating factor, but does not substantially compromise strength of the logging tool 102.

The propagating factor defines a slowness and attenuation of a wave. The slowness indicates a time for a wave to travel a given distance and the attenuation indicates a reduction in amplitude of the wave. The propagating factor is written as $k=\omega s+i\alpha$, where s is the slowness of a wave, $\alpha$ is the attenuation of the wave, and w is a frequency of the wave. The tool wave may have a propagating factor $k_{tool}$ and the formation waves may have a propagating factor $k_{formation}$ depending on characteristics of the tool mandrel 114 and geologic formation 106, respectively, and each propagating factor may be different.

The computer system 108 may have a transmitter control 130 and receiver control 132. The transmitter control 130 may control transmission of the acoustic wave 118 in a sonic frequency range by each of the one or more transmitters 118. The acoustic wave 118 may have one or more given frequencies and/or one or more given amplitudes. Each transmitter 118 may be arranged to transmit a same acoustic wave. Alternatively, one transmitter 118 may transmit an acoustic wave which differs (in amplitude and/or frequency) from another acoustic wave transmitted by another transmitter 118. Each transmitter 118 may be also arranged to transmit the acoustic wave at a same time as another transmitter 118 or at different times. The receiver control 132 may control reception of the formation wave 124 and/or tool wave 126 resulting from the transmission of the acoustic wave 12. One receiver 116 may be arranged to receive the formation wave 124 and/or tool wave 126 at a same time as another receiver 116 or at a different time.

The computer system 108 may also have an active tool wave reduction system 134. The active tool wave reduction system 134 may reduce the tool wave 126 received by the one or more receivers 116. The active reduction may be based on a transmitter approach and/or receiver approach. For example, in the transmitter approach, the transmitter control may cause the two or more transmitters to each transmit an acoustic wave with phases and/or amplitudes that cause the tool wave received by the one or more receivers to be reduced. As another example, in the receiver approach, the two or more receivers may receive both the formation wave and tool wave. The tool wave may be separated the formation wave and the formation wave output.

The formation wave may be used to determine a formation slowness log and/or a wave amplitude log. The formation slowness log indicates slowness of the formation waves as a function of depth in the geologic formation 106. The slowness indicates formation properties in the geologic formation 106 which can be used to determine a drilling direction for extraction of hydrocarbon from the geologic formation 106. The formation slowness log may be used in other ways as well. The wave amplitude log may indicate conditions in the borehole 104 such as an integrity of the cement 110 between the casing 112 and borehole 104 as a function of depth.

Figure 2:
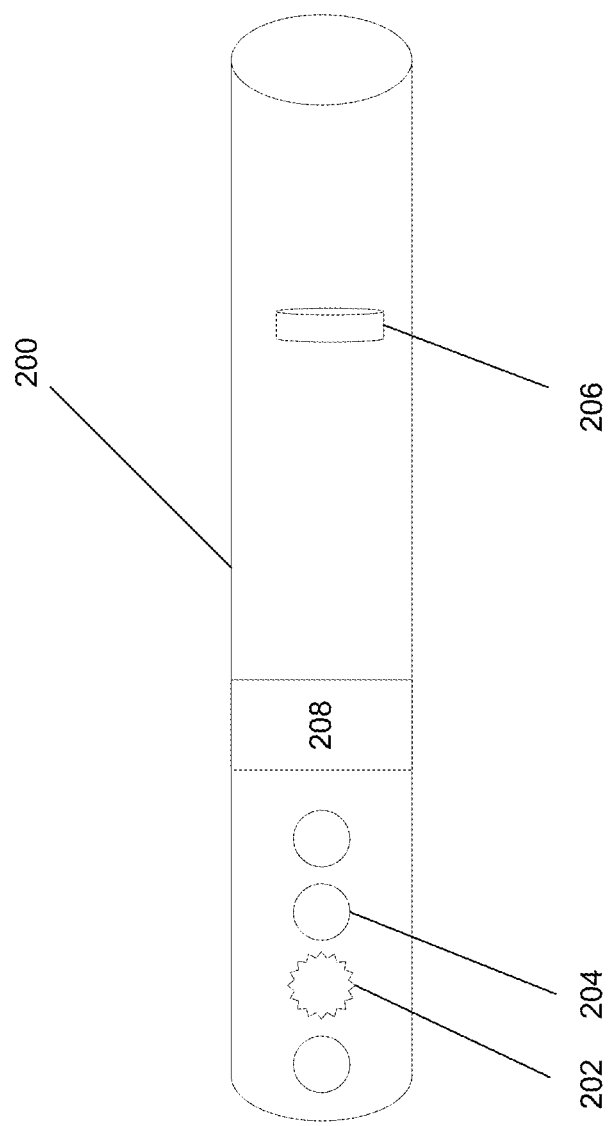
FIG. 2 illustrates an example tool mandrel of the logging tool for reducing the tool wave via a transmitter approach.

FIG. 2 illustrates an example tool mandrel 200 for reducing the tool wave via a transmitter approach. The tool mandrel 200 has a primary transmitter 202 and one or more auxiliary transmitters 204 positioned along the longitudinal z axis of the tool mandrel 200. The tool mandrel 200 may also have a receiver 206. In one or more examples, the primary transmitter 202 and one or more auxiliary transmitters 204 may be no different, other than its position along the mandrel 200. In one or more examples, the receiver 206 may be located further downhole from the primary transmitter 202 and the one or more auxiliary transmitters 204 when the tool mandrel 200 is positioned in a borehole. The tool mandrel 200 may be designed and/or modified with structure 208 (e.g., cuttings, holes, grooves) to ensure that the tool wave propagating factor (e.g., slowness and/or attenuation) is different from the formation wave propagating factor. For example, the tool mandrel 200 may have a slowness or attenuation that the general rock formation does not have. The primary transmitter 202 and one or more auxiliary transmitters 204 may transmit an acoustic wave such that the tool wave is reduced at the one or more receivers 206.

Figure 3:
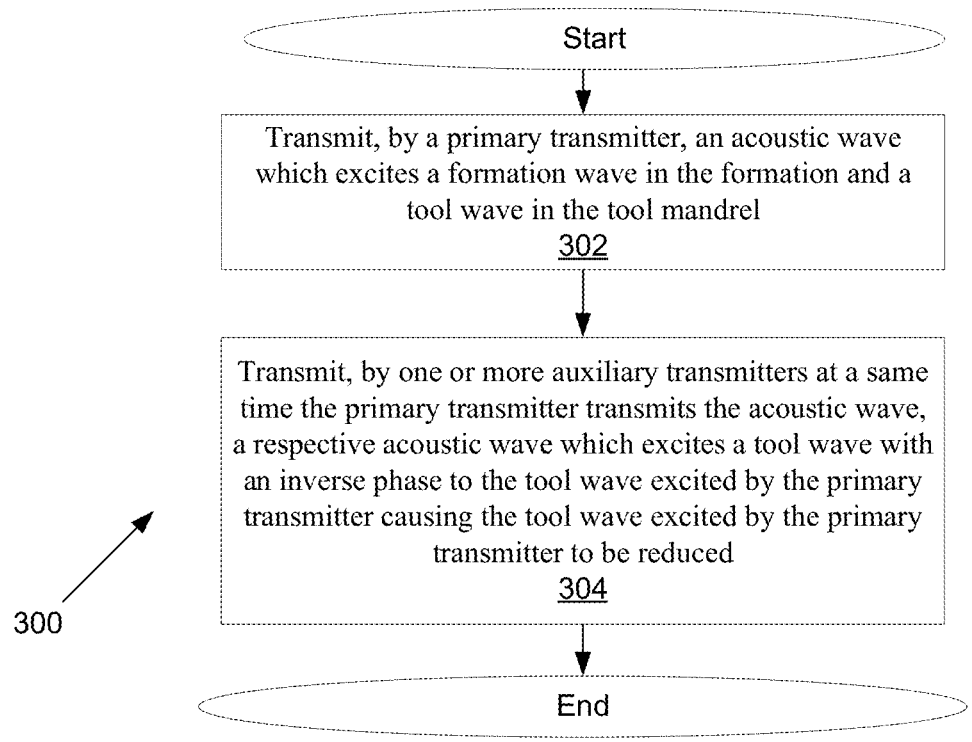
FIG. 3 is a flow chart of functions for reducing the tool wave via the transmitter approach.

FIG. 3 is a flow chart of functions 300 for reducing the tool wave via the transmitter approach. At 302, the primary transmitter may transmit an acoustic wave which excites a formation wave in the formation and a tool wave in the tool mandrel. The primary transmitter may be driven with a drive signal which causes the primary transmitter to output the acoustic wave. The drive signal may be represented as $f_{Pri}(\omega)$ which is function of frequency $\omega$ in the frequency domain. At 304, one or more auxiliary transmitters transmit, at a same time the primary transmitter transmits the acoustic wave, α respective acoustic wave which excites a tool wave with an inverse phase (e.g., same absolute amplitude and opposite phase, also referred to as inverse) to the tool wave excited by the primary transmitter, causing the tool wave excited by the primary transmitter to be reduced. Each transmitter n may be driven with a drive signal represented by the following equation:

$$f_{Aux}^n(\omega) = -f_{Pri}(\omega)\exp(ik_{tool}(z_{Aux}^n - z_{Pri})) \qquad (1)$$

where $f_{Pri}(\omega)$ is the drive pulse in the frequency domain at the primary transmitter, $k_{tool}$ represents the tool wave propagating factor (e.g., $k_{tool} = \omega s_{tool} + i\alpha$), and $z_{Pri}$ and $z_{Aux}^n$ denote the z axis position of the primary transmitter and the auxiliary transmitter respectively along the tool mandrel of the logging tool. Each transmitter n is driven with a corresponding drive signal. The drive signal which drives a given transmitter causes the given transmitter to generate a corresponding acoustic wave. In one or more examples, the drive signal may have a similar amplitude and/or phase characteristics as the corresponding acoustic wave which is generated.

The tool wave propagating factor may be determined in many ways. In one example, slowness and attenuation associated with the tool wave propagating factor may be determined based on design of the tool mandrel. The materials and/or shape of the tool mandrel may determine the tool wave propagating factor. In another example, the tool wave propagating factor may be determined based on analysis of the waves received by the one or more receivers.

Figure 4:
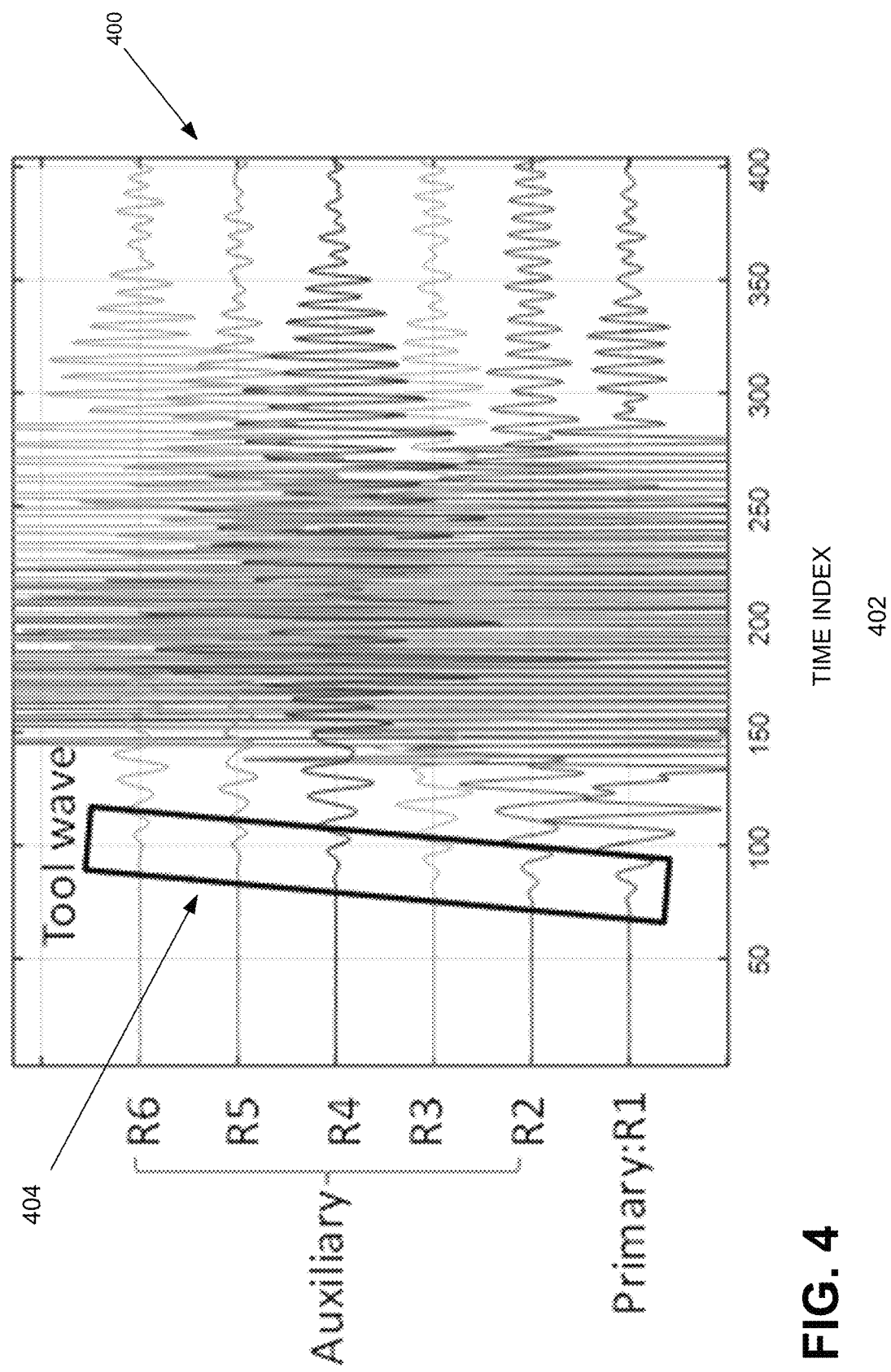
FIG. 4 illustrates slowness of a tool wave propagating factor.

FIG. 4 illustrates example waves 400 received by the one or more receivers R1 to R6 as a function of a time index 402. The example waves 400 may be used to determine the slowness of the tool wave propagating factor by analysis. The primary receiver R1 may be located closest to the transmitter and receive a wave before the receivers R2 to R6 receive the wave. The wave received by the primary receiver is labeled as R1 and a wave received by each of the auxiliary receivers is labeled as R2 to R6, respectively. The rectangular box 402 indicates the tool wave whose slowness is 67 s/ft.

Figure 5:
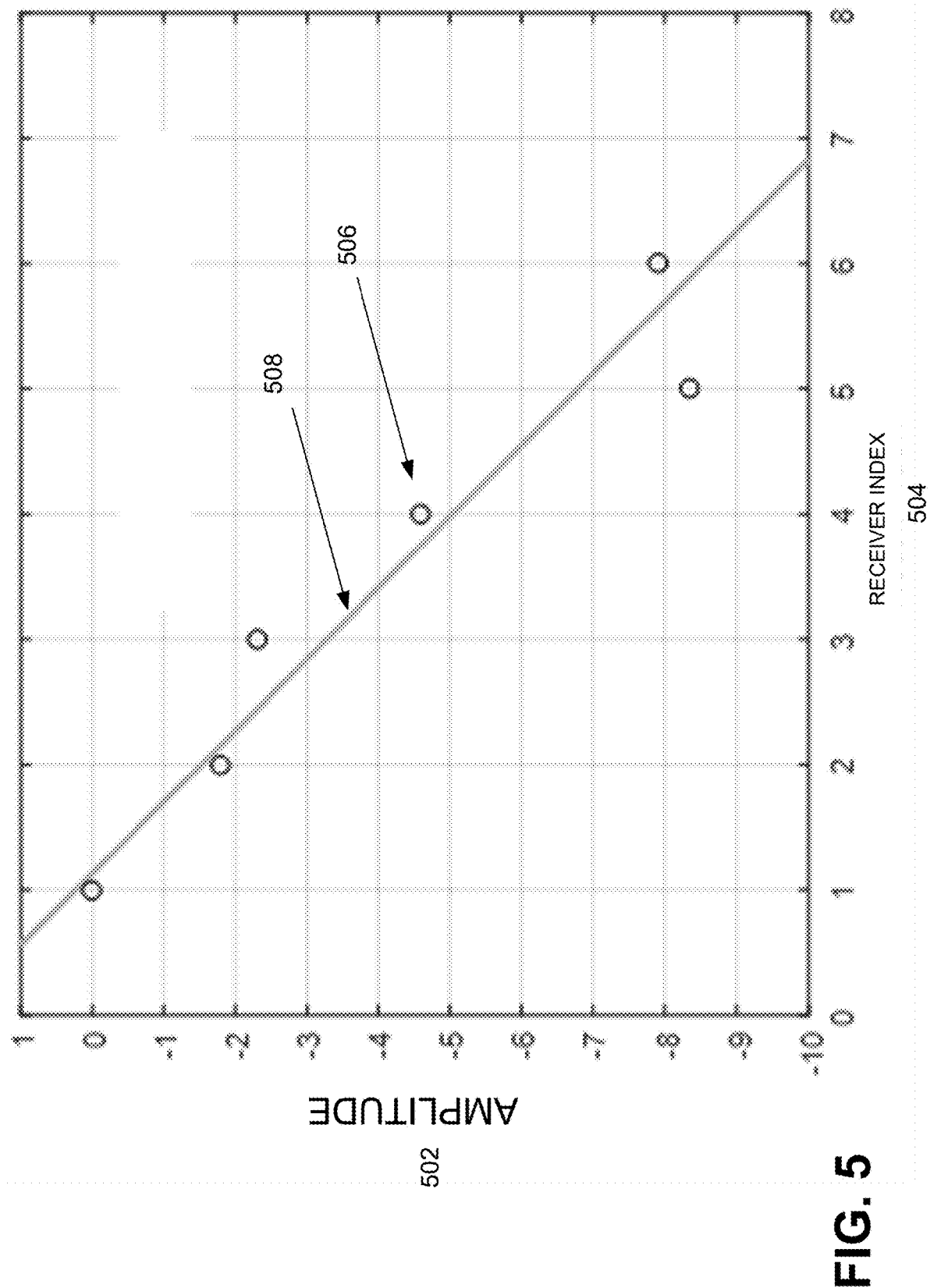
FIG. 5 illustrates attenuation of the tool wave propagating factor.

FIG. 5 illustrates determining an attenuation of the tool wave based on the example waves 400. Each receiver may receive a tool wave. The tool wave received by each receiver may be normalized and plotted as a function of amplitude on a vertical axis 502 and the receiver which received the tool wave on a horizontal axis 504 (indicated as a receiver index). The plotted normalized tool wave amplitude 500 is shown as circles 506 associated with each receiver. An attenuation of the tool wave is calculated based on the normalized tool wave amplitudes. The normalized tool wave amplitudes are fit to a line 508 indicative of the attenuation. With a linear fit on the amplitude in dB, the attenuation of the tool wave is calculated to be 3.5 dB/ft.

Equation (1) intuitively calculates what drive signal causes the auxiliary transmitters excite an inverse-phase tool wave at the position of the primary transmitter and/or further downhole which will then propagate to the receiver. In one or more examples, the excited inverse-phase tool wave may have an opposite phase (e.g., 180 degree shift) and/or same absolute amplitude to the tool wave excited by the primary transmitter at the position of the primary transmitter and/or further downhole. Further, different weights may be applied to each drive signal associated with each auxiliary transmitter to differ contribution of each auxiliary transmitter. As a result of the transmission by the primary and auxiliary transmitters, the tool wave is reduced at the receiver. The reduction is analytically calculated as:

$$\min\left\{\sum_{n=1}^{N} \text{Weight}(n) f_{Aux}^n(\omega)\exp(ik_{tool}(z_{Pri} - z_{Aux}^n)) + f_{Pri}(\omega)\right\} \qquad (2)$$

where Weight(n) represents amplitude weights applied at different auxiliary transmitters n. For example, Weight(n) =1/N may indicate unified weights. As another example, weights may be calculated based on a signal to noise ratio (SNR) values of an expected tool wave at a given transmitter, in order to improve reduction of the tool wave and increase SNR of the resulting formation wave received at a receiver.

Figure 6:
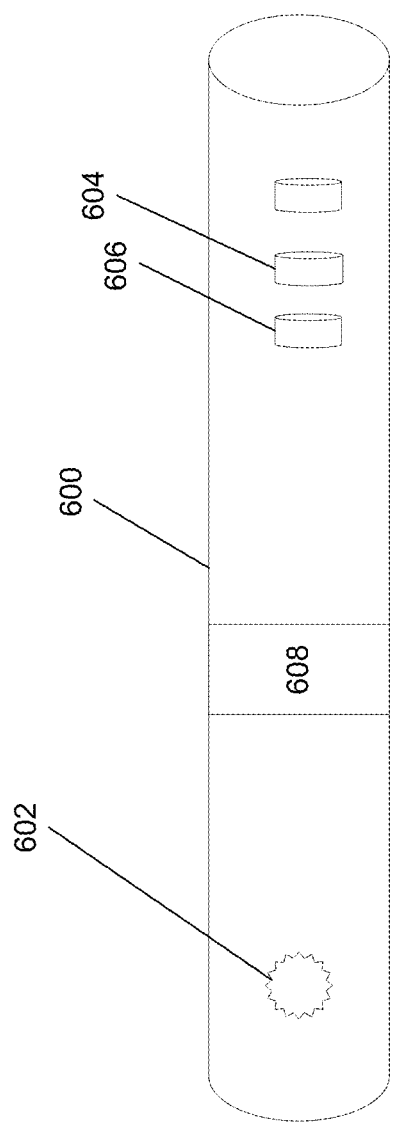
FIG. 6 illustrates an example tool mandrel of the logging tool for reducing the tool wave via a receiver approach.

FIG. 6 illustrates an example of the tool mandrel 600 for reducing the tool wave via the receiver approach. The tool mandrel 600 has a transmitter 602, a primary receiver 604, and one or more auxiliary receivers 606, each positioned along a longitudinal axis z of the tool mandrel 600. In one or more examples, the primary receiver 604 and one or more auxiliary receivers 606 may be located further downhole from the transmitter 602 when the tool mandrel 600 is positioned in a borehole. The primary receiver may be in between other auxiliary receivers in the example shown in FIG. 6. In other examples, a first receiver may be a primary receiver and further receivers downhole from the transmitter and primary receiver may be auxiliary receivers. In one or more examples, the primary receiver 604 and one or more auxiliary receivers 606 may be no different, other than its position along the mandrel 600. The tool mandrel 600 may be designed and/or modified with structure 608 (e.g., cuttings, holes, grooves) so that the tool wave propagating factor (e.g., slowness and/or attenuation) is different from the formation wave propagating factor. For example, the tool mandrel 600 may have a slowness or attenuation that the general rock formation does not have. The primary receiver 604 and one or more auxiliary receivers 606 may each receive a tool wave and formation wave.

Figure 7:
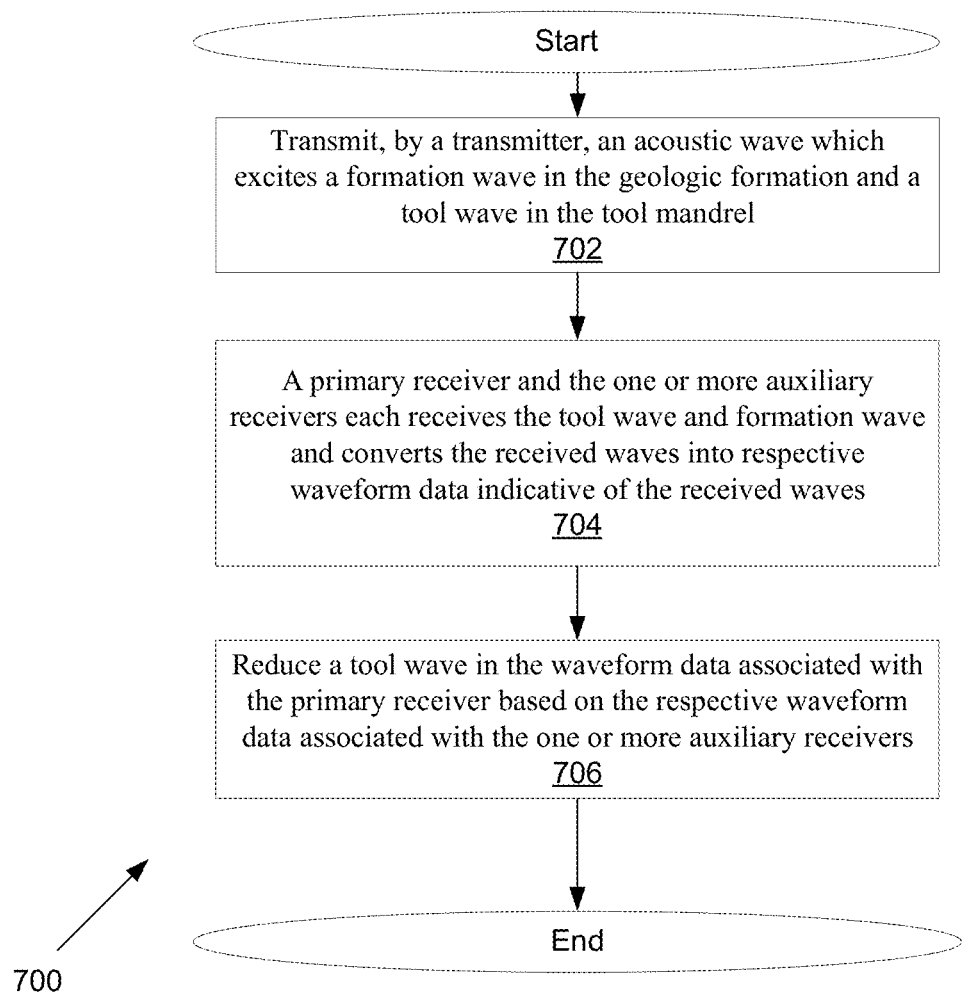
FIG. 7 is a flow chart of functions for reducing the tool wave via the receiver approach.

FIG. 7 is a flow chart of functions 700 for reducing the tool wave via the receiver approach. At 702, a transmitter may transmit an acoustic wave which excites a formation wave in the geologic formation and a tool wave in the tool mandrel. At 704, a primary receiver and the one or more auxiliary receivers each receives the tool wave and formation wave and converts the received waves into respective waveform data indicative of the received waves. At 706, a tool wave in the waveform data associated with the primary receiver may be reduced based on the respective waveform data associated with the one or more auxiliary receivers. For example, the waveform data from each of the auxiliary receivers may be used to estimate an inverse phase of the tool wave in the waveform data associated with the primary receiver.

The estimated tool wave may be created by backpropagating the waveform data associated with each of the auxiliary receivers based on a position of the primary receiver and auxiliary receiver:

$$Wav_{RTool}(\omega) = -\sum_{n=1}^{N} \text{Weight}(n) Wav_{Aux}^n(\omega) \exp(ik_{tool}(z_{Pri} - z_{Aux}^n)), \quad (3)$$

where $Wav_{RTool}$ represents the estimated tool wave, $Wav_{Aux}^N(\omega)$ represent waveform data at the nth auxiliary receiver, Weight(n) represent weights to differ contribution of each the waveform associated with each auxiliary receiver, and $z_{Pri}$ and $z_{Aux}^n$ denote the z axis position of the primary receiver and the auxiliary receiver respectively along the tool mandrel of the logging tool. To simplify the processing, equation 3 might be implemented in the time-domain as:

$$Wav'_{RTool}(t) = \\ -\sum_{n=1}^{N} \text{Weight}(n) Wav_{Aux}^{\prime n}(t - s_{tool}(z_{Pri} - z_{Aux}^n)) \exp(i\alpha_{tool}(z_{Pri} - z_{Aux}^n)), \quad (4)$$

where $s_{tool}$ represents tool wave slowness, $\alpha_{tool}$ represents tool wave attenuation.

Figure 8:
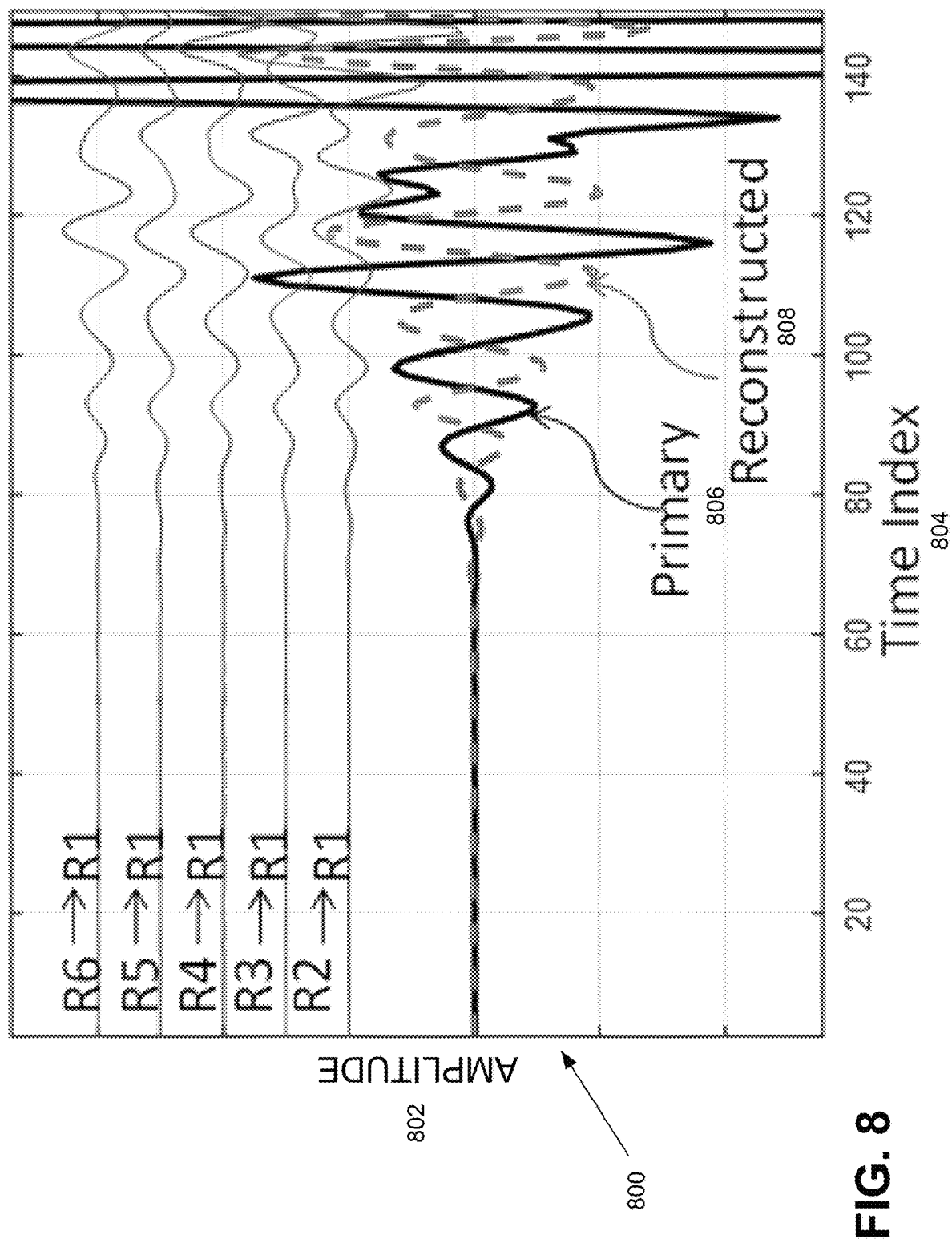
FIG. 8 illustrates back propagation for reducing the tool wave via the receiver approach.

FIG. 8 illustrates a back propagation process 800 associated with tool wave reduction via the receiver approach. Waveforms are plotted as a function of amplitude 802 and time index 804. Primary waveform 806 represents waveform data received by the primary receiver. R2 to R6 represent waveform data received by auxiliary receivers R2 to R6 after back propagation where the weight of each waveform is selected as 0.2. Estimated waveform data predicted by equation 4 and shown as reconstructed waveform 808 has equal absolute amplitude and opposite phase compared to the primary waveform 806 (e.g., inverse phase to the tool wave). The tool wave may be removed from the primary waveform by further signal processing:

$$Wav_{For}(\omega) = Wav_{Pri}(\omega) + Wav_{RTool}(\omega), \quad (5)$$

or in the time domain, by $$Wav'_{For}(t) = Wav'_{Pri}(t) + Wav'_{RTool}, \quad (6)$$

where $Wav_{For}(\omega)$ and $Wav'_{For}(t)$ represent remaining target signals (e.g., formation wave) in the frequency domain and in the time domain, respectively.

Figure 9:
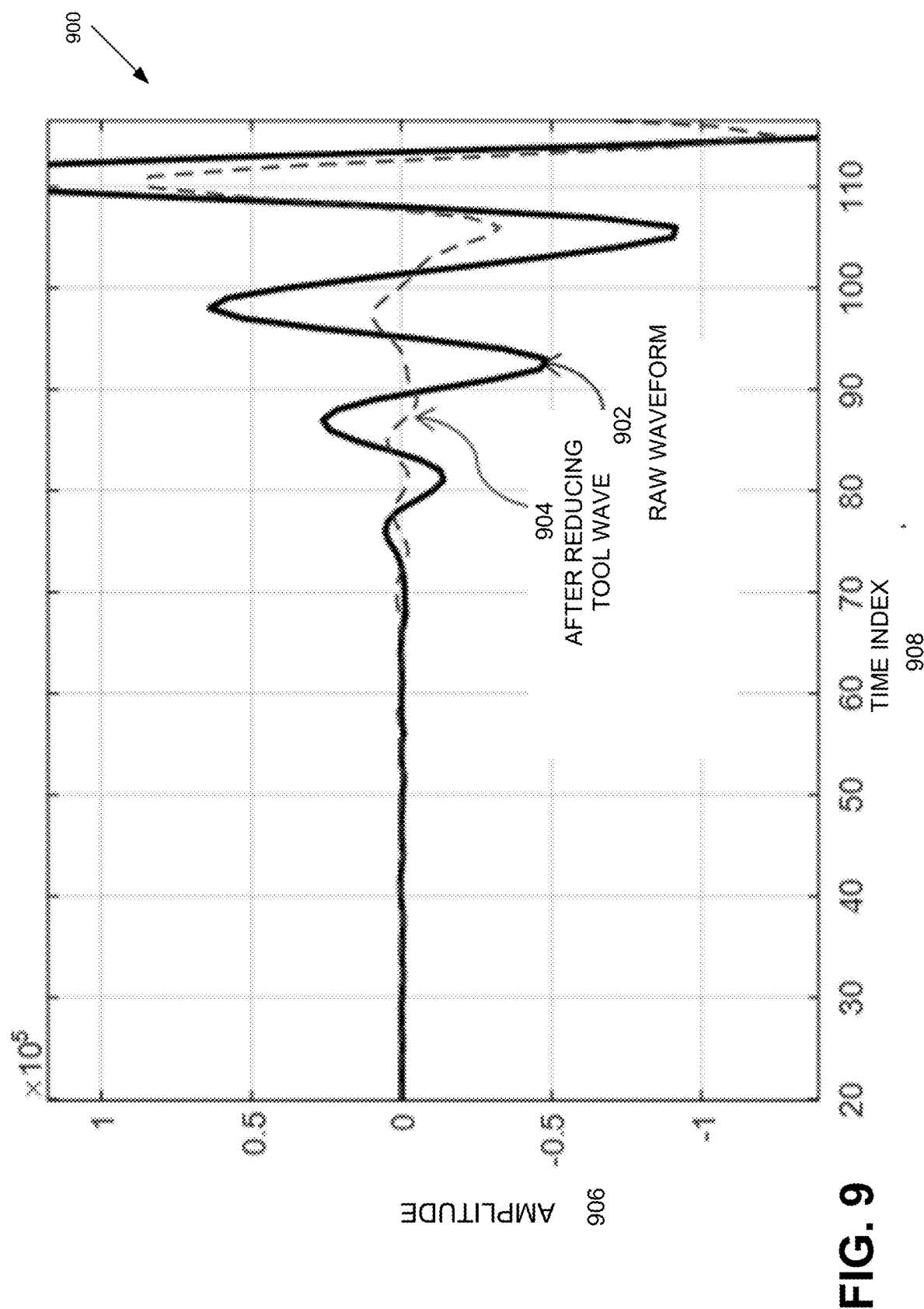
FIG. 9 illustrates a comparison between waveform data associated with the primary transmitter before tool wave reduction and waveform data associated with the primary transmitter after tool wave reduction.

FIG. 9 illustrates a comparison 900 between the waveform data 902 associated with the primary receiver before tool wave reduction and the waveform data 904 associated with the primary receiver after tool wave reduction plotted as a function of amplitude 906 and time index 908. The tool wave is suppressed by about −20 dB.

Other variations for actively reducing the tool wave are also possible. In one example, each transmitter of the tool mandrel 200 may transmit an acoustic wave to the receiver in sequence to the receiver such that each transmission by each transmitter does not overlap. Equations 3-4 may be applied to each wavedata received by each receiver based on transmission of the acoustic wave by each transmitter in sequence to estimate an inverse phase of a tool wave. In this regard, $Wav_{Aux}^n(\omega)$ represents waveform data associated with waves received by the receiver based on transmission by the nth auxiliary transmitter. The primary transmitter transmitting an acoustic wave to the receiver may excite a tool wave which is then removed using the estimated inverse phase tool wave based on equations 5-6. In another example, both the transmitter and receiver approach may be combined to perform tool wave reduction. The transmitter approach may reduce the tool wave and the receiver approach may also reduce any tool wave not reduced by the transmitter approach. In yet another example, multiple receivers may be considered collectively as the primary receiver while remaining receivers are auxiliary receivers. With 1 representing each of the primary receivers, the tool wave is reduced via the following signal processing on wavedata associated with each receiver similar to equations 3-6 above:

$$Wav_{RTool}^l(\omega) = -\sum_{n=1}^{N} \text{Weight}(n) Wav_{Aux}^n(\omega) \exp(ik_{tool}(z_{Pri}^l - z_{Aux}^n)),$$

$$Wav_{RTool}^l(t) = \\ -\sum_{n=1}^{N} \text{Weight}(n) Wav_{Aux}^{\prime n}(t - s_{tool}(z_{Pri}^l - z_{Aux}^n)) \exp(i\alpha_{tool}(z_{Pir}^l - z_{Aux}^n)),$$

$$Wav_{For}^l(\omega) = Wav_{Pri}^l(\omega) + Wav_{RTool}^l(\omega),$$

$$Wav_{For}^l(t) = Wav_{Pri}^l(t) + Wav_{RTool}^l(t)$$

Figure 10:
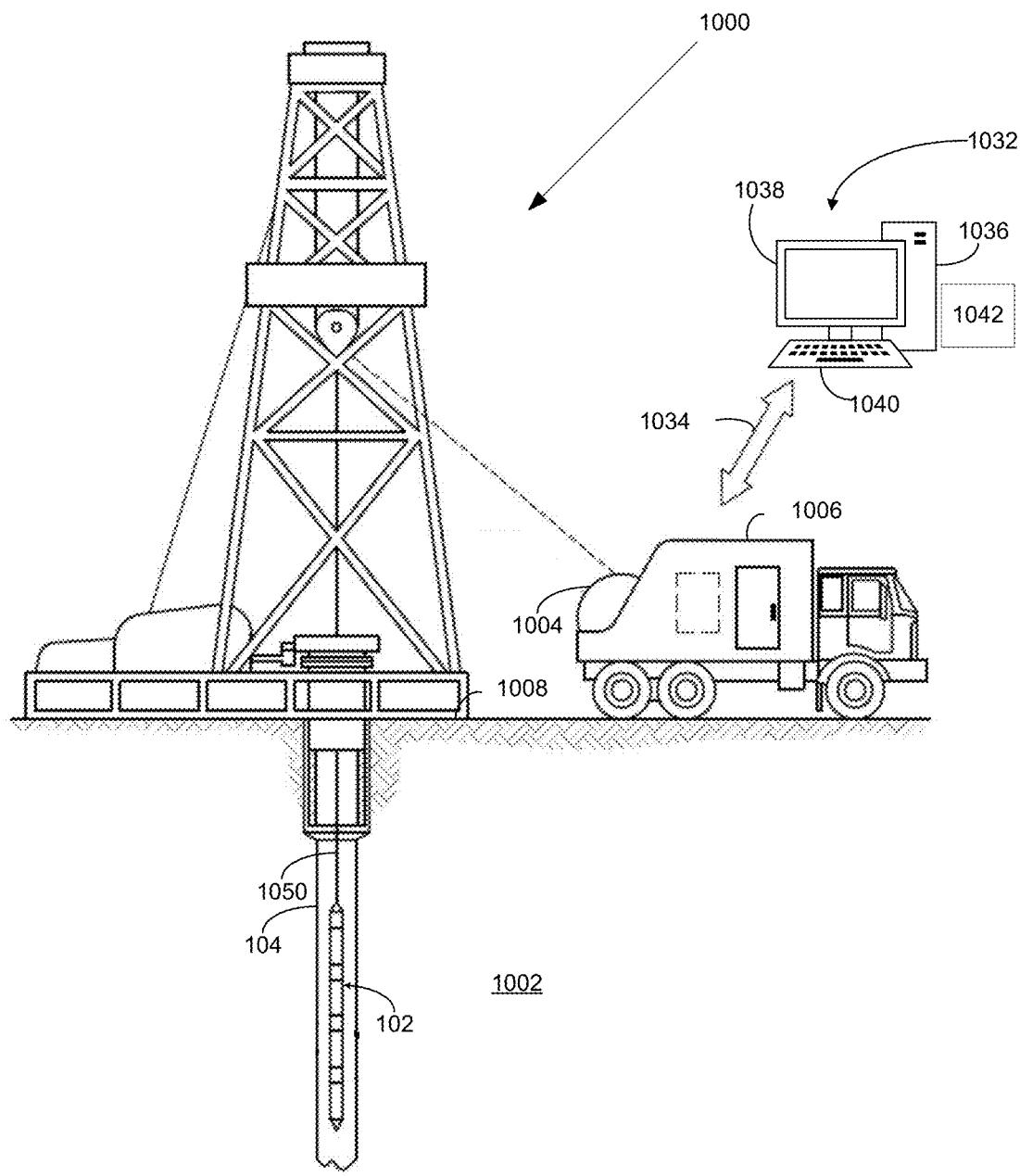
FIG. 10 is a schematic diagram of apparatus to perform some of the operations and functions described with reference to FIGS. 1-9.

FIG. 10 is a schematic diagram of an apparatus 1000 that can be used to perform some of the operations and functions described with reference to FIGS. 1-9. A schematic diagram 1000 is shown of downhole tool 102 on a wireline 1050. As illustrated, a borehole 104 may extend through the geologic formation 1002. It should be noted that while FIG. 10 generally depicts a land-based wireline logging system, those skilled in the art will readily recognize that the principles described herein are equally applicable to subsea logging operations that employ floating or sea-based platforms and rigs, without departing from the scope of the disclosure.

As illustrated, hoist 1004 may be used to run a logging tool 102 into borehole 104. Hoist 1004 may be disposed on a recovery vehicle 1006. Hoist 1004 may be used, for example, to raise and lower wireline 1050 in borehole 104. While hoist 1004 is shown on recovery vehicle 1006, it should be understood that wireline 1050 may alternatively be disposed from a hoist 1004 that is installed at the surface 1008 instead of being located on recovery vehicle 1006. Logging tool 102 may be suspended in borehole 104 on wireline 1050. Other conveyance types may be used for conveying logging tool 102 into borehole 104, including coiled tubing, wired drill pipe, slickline, and downhole tractor, for example. Logging tool 102 may comprise a tool mandrel, which may be elongated as shown on FIG. 10. Tool body may be any suitable material, including without limitation titanium, stainless steel, alloys, plastic, combinations thereof, and the like. Logging tool 102 may further include one or more transmitters and one or more receivers for tool wave reduction.

Computer system 1032 may include a processing unit 1036, a monitor 1038, an input device 1040 (e.g., keyboard, mouse, etc.), and/or machine-readable media 1042 (e.g., optical disks, magnetic disks) that can store code representative of the methods described herein for reducing the tool wave excited by a transmitter of the logging tool 102 via the transmitter and/or receiver approach. To facilitate tool wave reduction, communication link 1034 (which may be wired or wireless, for example) may transmit waveform data associated with one or more receivers from the logging tool 102 and the computer system 1032 at surface 1008 and/or drive signals from the computer system 1132 to the logging tool 102 to cause the one or more transmitters to output an acoustic wave to reduce the tool wave. Communication link 1034 may implement one or more of various known telemetry techniques such as mud-pulse, acoustic, electromagnetic, etc. In addition to, or in place of processing at the surface 1008, processing for reducing the tool wave may occur downhole by the logging tool 102.

Figure 11:
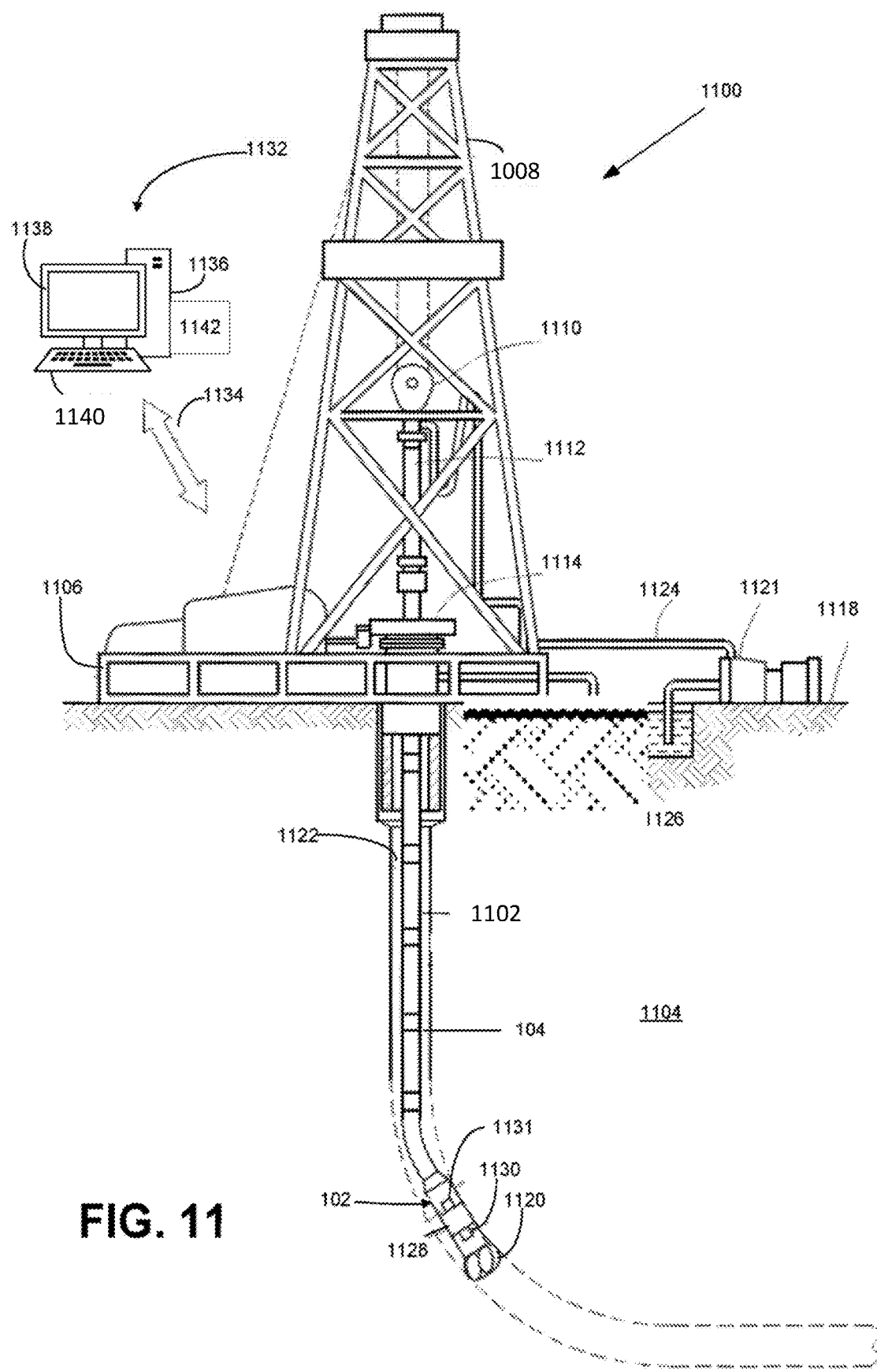
FIG. 11 is another schematic diagram of apparatus to perform some of the operations and functions described with reference to FIGS. 1-9.

FIG. 11 is another schematic diagram of an apparatus 1100 that can be used to perform some of the operations and functions described with reference to FIGS. 1-9. The apparatus 1100 includes a logging tool 102 disposed on a drill string 1102 of a depicted well apparatus 1100. As illustrated, a borehole 104 may extend through geologic formation 1104. While borehole 104 is shown extending generally vertically into the geological formation 1104, the principles described herein are also applicable to boreholes that extend at an angle through the geological formation 1104, such as horizontal and slanted boreholes. For example, although FIG. 11 shows a vertical or low inclination angle well, high inclination angle or horizontal placement of the well and equipment is also possible. It should further be noted that while FIG. 11 generally depicts a land-based operation, those skilled in the art will readily recognize that the principles described herein are equally applicable to subsea operations that employ floating or sea-based platforms and rigs, without departing from the scope of the disclosure.

The apparatus further includes a drilling platform 1106 that supports a derrick 1108 having a traveling block 1110 for raising and lowering drill string 1102. Drill string 1102 may include, but is not limited to, drill pipe and coiled tubing, as generally known to those skilled in the art. A kelly 1112 may support drill string 1102 as it may be lowered through a rotary table 1114. A drill bit 1120 may be attached to the distal end of drill string 1102 and may be driven either by a downhole motor and/or via rotation of drill string 1102 from the surface 1118. Without limitation, drill bit 1120 may include, roller cone bits, PDC bits, natural diamond bits, any hole openers, reamers, coring bits, and the like. As drill bit 1120 rotates, it may create and extend borehole 104 that penetrates various subterranean formations such as 1104. A pump 1122 may circulate drilling fluid through a feed pipe 1124 to kelly 1112, downhole through interior of drill string 1102, through orifices in drill bit 1120, back to surface 1118 via annulus 1122 surrounding drill string 1102, and into a retention pit 1126.

Drill bit 1120 may be just one piece of a downhole assembly that may include the logging tool 102. Logging tool 102 may be made of any suitable material, including without limitation titanium, stainless steel, alloys, plastic, combinations thereof, and the like. Logging tool 102 may further include one or more transmitters 1130 and one or more receivers 1131 for actively reducing a tool wave excited by the logging tool 102 separated by a collar 1128.

Computer system 1132 may include a processing unit 1136, a monitor 1138, an input device 1140 (e.g., keyboard, mouse, etc.), and/or machine readable media 1142 (e.g., optical disks, magnetic disks) that can store code representative of the methods described herein for reducing the tool wave excited by a transmitter 1130 of the logging tool 102 via the transmitter and/or receiver approach. Computer system 1132 may act as a data acquisition system and data processing system to reduce the tool wave. This processing may occur at the surface 1118 in real-time. Alternatively, the processing may occur at surface 1118 or another location after withdrawal of logging tool 102 from borehole 104. Still alternatively, the processing may be performed downhole in the geologic formation 1104 by the logging tool 102. Any suitable technique may be used for transmitting signals, e.g., waveform data, to the computer system 1132 residing on the surface 1118. As illustrated, a communication link 1134 (which may be wired or wireless, for example) may transmit data between the logging tool 102 and the computer system 1132 at the surface 1118. The data may be waveform data associated with the one or more receivers 1131 transmitted from the logging tool 102 to the computer system 1132 and/or drive signals transmitted from the computer system 1132 to the logging tool 102 to cause the one or more transmitters to output an acoustic wave to reduce the tool wave.

Figure 12:
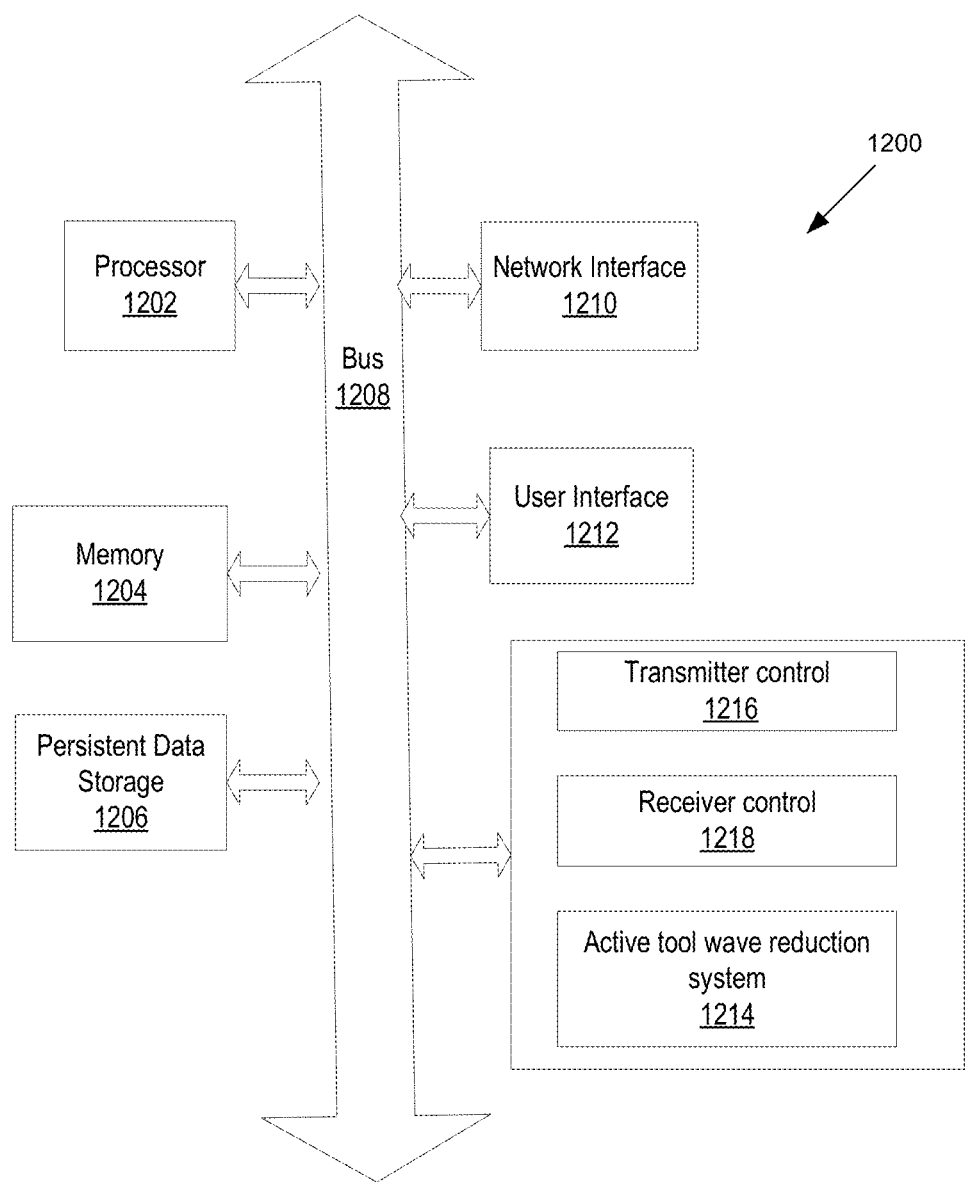
FIG. 12 is a block diagram of a computer system associated with reducing the tool wave via the transmitter and/or receiver approach.

FIG. 12 is a block diagram 1200 of apparatus of the computer system 1032, 1132 and/or the logging tool 102 for actively reducing a tool wave. The apparatus may be located on the surface, downhole, or partially on the surface and partially downhole.

The block diagram 1200 includes a processor 1202 (possibly including multiple processors, multiple cores, multiple nodes, and/or implementing multi-threading, etc.). The block diagram 1200 includes memory 1204. The memory 1204 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more other possible realizations of non-transitory machine-readable media/medium.

The block diagram 1200 may also include a persistent data storage 1206. The persistent data storage 1206 can be a hard disk drive, such as a magnetic storage device which stores one or more of waveform data. The block diagram 1200 also includes a bus 1208 (e.g., PCI, ISA, PCI-Express) and a network interface 1210 in communication with a logging tool. The block diagram 1200 may also have an active tool wave reduction system 1214, a transmitter control 1216, and receiver control 1218 to actively reduce a tool wave in accordance with the methods described herein, including the described transmitter approach and receiver approach.

The block diagram 1200 may further comprise a user interface 1212 in the case when the block diagram 1200 is associated with the computer system 1032, 1132. The user interface 1212 may include a display such as a computer screen or other visual device to show the formation waves to engineering personnel. The user interface 1214 may also include an input device such as a mouse, keyboard.

The block diagram 1200 may implement any one of the previously described tool wave reduction functionalities partially (or entirely) in hardware and/or software (e.g., computer code, program instructions, program code) stored on a non-transitory machine readable medium/media. In some instances, the software is executed by the processor 1202. Further, realizations can include fewer or additional components not illustrated in FIG. 12 (e.g., video cards, audio cards, additional network interfaces, peripheral devices, etc.). The processor 1202 and the memory 1204 are coupled to the bus 1208. Although illustrated as being coupled to the bus 1208, the memory 1204 can be coupled to the processor 1202.

The flowcharts are provided to aid in understanding the illustrations and are not to be used to limit scope of the claims. The flowcharts depict example operations that can vary within the scope of the claims. Additional operations may be performed; fewer operations may be performed; the operations may be performed in parallel; and the operations may be performed in a different order. For example, the operations depicted in blocks 302, 304 and 702 to 706 can be performed in parallel or concurrently. It will be understood that each block of the flowchart illustrations and/or block diagrams, and combinations of blocks in the flowchart illustrations and/or block diagrams, can be implemented by program code. The program code may be provided to a processor of a general purpose computer, special purpose computer, or other programmable machine or apparatus.

As will be appreciated, aspects of the disclosure may be embodied as a system, method or program code/instructions stored in one or more machine-readable media. Accordingly, aspects may take the form of hardware, software (including firmware, resident software, micro-code, etc.), or a combination of software and hardware aspects that may all generally be referred to herein as a "circuit," "module" or "system." The functionality presented as individual modules/units in the example illustrations can be organized differently in accordance with any one of platform (operating system and/or hardware), application ecosystem, interfaces, programmer preferences, programming language, administrator preferences, etc.

Any combination of one or more machine readable medium(s) may be utilized. The machine readable medium may be a machine readable signal medium or a machine readable storage medium. A machine readable storage medium may be, for example, but not limited to, a system, apparatus, or device, that employs any one of or combination of electronic, magnetic, optical, electromagnetic, infrared, or semiconductor technology to store program code. More specific examples (a non-exhaustive list) of the machine readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a machine readable storage medium may be any tangible medium that can contain, or store a program for use by or in connection with an instruction execution system, apparatus, or device. A machine readable storage medium is not a machine readable signal medium.

A machine readable signal medium may include a propagated data signal with machine readable program code embodied therein, for example, in baseband or as part of a carrier wave. Such a propagated signal may take any of a variety of forms, including, but not limited to, electromagnetic, optical, or any suitable combination thereof. A machine readable signal medium may be any machine readable medium that is not a machine readable storage medium and that can communicate, propagate, or transport a program for use by or in connection with an instruction execution system, apparatus, or device.

Program code embodied on a machine readable medium may be transmitted using any appropriate medium, including but not limited to wireless, wireline, optical fiber cable, RF, etc., or any suitable combination of the foregoing.

Computer program code for carrying out operations for aspects of the disclosure may be written in any combination of one or more programming languages, including an object oriented programming language such as the Java® programming language, C++ or the like; a dynamic programming language such as Python; a scripting language such as Perl programming language or PowerShell script language; and conventional procedural programming languages, such as the "C" programming language or similar programming languages. The program code may execute entirely on a stand-alone machine, may execute in a distributed manner across multiple machines, and may execute on one machine while providing results and or accepting input on another machine.

The program code/instructions may also be stored in a machine readable medium that can direct a machine to function in a particular manner, such that the instructions stored in the machine readable medium produce an article of manufacture including instructions which implement the function/act specified in the flowchart and/or block diagram block or blocks.

While the aspects of the disclosure are described with reference to various implementations and exploitations, it will be understood that these aspects are illustrative and that the scope of the claims is not limited to them. In general, techniques for reducing a tool wave excited by a logging tool as described herein may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the disclosure. In general, structures and functionality presented as separate components in the example configurations may be implemented as a combined structure or component. Similarly, structures and functionality presented as a single component may be implemented as separate components. These and other variations, modifications, additions, and improvements may fall within the scope of the disclosure.

Use of the phrase "at least one of" preceding a list with the conjunction "and" should not be treated as an exclusive list and should not be construed as a list of categories with one item from each category, unless specifically stated otherwise. A clause that recites "at least one of A, B, and C" can be infringed with only one of the listed items, multiple of the listed items, and one or more of the items in the list and another item not listed.

As used herein, the term "or" is inclusive unless otherwise explicitly noted. Thus, the phrase "at least one of A, B, or C" is satisfied by any element from the set {A, B, C} or any combination thereof, including multiples of any element.

EXAMPLE EMBODIMENTS

Example embodiments include the following:

Embodiment 1

A method comprising: transmitting, by a primary transmitter positioned along a longitudinal axis of a logging tool, an acoustic wave into a geologic formation which excites a tool wave in the logging tool and a formation wave in the geologic formation, wherein the logging tool comprises a tool wave propagating factor which is different from a formation wave propagating factor; transmitting, by one or more auxiliary transmitters positioned along the longitudinal axis of the logging tool, an acoustic wave which causes the tool wave excited by the primary transmitter to be reduced; receiving, by one or more receivers along the longitudinal axis of the logging tool, the formation wave and the reduced tool wave.

Embodiment 2

The method of Embodiment 1, wherein transmitting, by one or more auxiliary transmitters of the logging tool, the acoustic wave comprises driving a given auxiliary transmitter with a drive signal applied to the primary transmitter, adjusted by the tool wave propagating factor.

Embodiment 3

The method of Embodiment 1 or 2, wherein the tool wave propagating factor indicates a slowness and attenuation of the tool wave.

Embodiment 4

The method of any one of Embodiment 1-3, wherein the drive signal is further adjusted based on a distance between the primary transmitter and the given auxiliary transmitter.

Embodiment 5

The method of any one of Embodiment 1-4, wherein the primary transmitter and the one or more auxiliary transmitters transmit a respective acoustic wave at a same time.

Embodiment 6

The method of any one of Embodiment 1-5, wherein the acoustic wave which causes the tool wave excited by the primary transmitter to be reduced, excites an inverse of the tool wave in the logging tool.

Embodiment 7

The method of any one of Embodiment 1-6, wherein transmitting, by one or more auxiliary transmitters of the logging tool, the acoustic wave which causes the tool wave excited by the primary transmitter to be reduced comprises transmitting by each of the one or more auxiliary transmitters a respective acoustic wave based on one or more weights.

Embodiment 8

A system comprising: a logging tool comprising one or more transmitters and one or more receivers, wherein the one or more transmitters and one or more receivers are positioned along a longitudinal axis of the logging tool, and wherein the logging tool comprises a tool wave propagating factor which is different from a formation wave propagating factor; a processor; a non-transitory machine readable media having program code executable by the processor to cause the processor to: transmit, by a primary transmitter of the one or more transmitters of the logging tool, an acoustic wave into a geologic formation which excites a tool wave in the logging tool and a formation wave in the geologic formation; transmit, by one or more auxiliary transmitters of the one or more receivers of the logging tool, an acoustic wave which causes the tool wave excited by the primary transmitter to be reduced; receive, by one or more receivers of the logging tool, the formation wave and the reduced tool wave.

Embodiment 9

The system of Embodiment 8, wherein the program code to transmit, by one or more auxiliary transmitters of the logging tool, the acoustic wave comprises program code to drive a given auxiliary transmitter with a drive signal applied to the primary transmitter, adjusted by the tool wave propagating factor.

Embodiment 10

The system of Embodiment 8 or 9, wherein the tool wave propagating factor indicates a slowness and attenuation of the tool wave.

Embodiment 11

The system of any one of Embodiment 8-10, wherein the drive signal is further adjusted based on a distance between the primary transmitter and the given auxiliary transmitter.

Embodiment 12

The system of any one of Embodiment 8-11, wherein the primary transmitter and the one or more auxiliary transmitters transmit a respective acoustic wave at a same time.

Embodiment 13

The system of any one of Embodiment 8-12, wherein the acoustic wave which causes the tool wave excited by the primary transmitter to be reduced, excites an inverse of the tool wave.

Embodiment 14

The system of any one of Embodiment 8-13, wherein the program code to transmit, by one or more auxiliary transmitters of the logging tool, the acoustic wave which causes the tool wave excited by the primary transmitter to be reduced comprises program code to transmit by each of the one or more auxiliary transmitters a respective acoustic wave based on one or more weights.

Embodiment 15

A method comprising: transmitting, by a transmitter positioned along a longitudinal axis of a logging tool, an acoustic wave into a geologic formation which excites a tool wave and a formation wave in the geologic formation, wherein the logging tool comprises a tool wave propagating factor which is different from a formation wave propagating factor; receiving, by one or more receivers positioned along the longitudinal axis of the logging tool, the formation wave and the tool wave; propagating waveform data associated with the tool wave and formation wave received by an auxiliary receiver of the one or more receivers based on a distance between the auxiliary receiver and a primary receiver of the one or more receivers; and reducing the tool wave in waveform data associated with the formation wave and the tool wave received by a primary receiver of the one or more receivers based on the propagated waveform data.

Embodiment 16

The method of Embodiment 15, wherein the tool wave propagating factor indicates a slowness and attenuation of the tool wave.

Embodiment 17

The method of Embodiment 15 or 16, wherein the propagated waveform data associated with each receiver represents an inverse of the tool wave.

Embodiment 18

The method of any one of Embodiment 15-17, further comprising weighting an amplitude of the propagated waveform data associated with a given receiver of the one or more receivers.

Embodiment 19

The method of any one of Embodiment 15-18, wherein propagating the waveform data comprises forward or back propagating the waveform data based on a spatial position of the auxiliary receiver with respect to the primary receiver.

Embodiment 20

The method of any one of Embodiment 15-19, wherein propagating the waveform data comprises adjusting the waveform data by the tool wave propagating factor.

What is claimed is:

1. A method comprising:
   transmitting, by a primary transmitter positioned along a longitudinal axis of a logging tool, a primary acoustic wave into a geologic formation which excites a tool wave and a formation wave in the geologic formation, wherein the logging tool comprises a tool wave propagating factor which is different from a formation wave propagating factor;
   receiving, by one or more receivers positioned along the longitudinal axis of the logging tool, the formation wave and the tool wave;
   propagating waveform data associated with the tool wave and formation wave received by an auxiliary receiver of the one or more receivers based on a distance between the auxiliary receiver and a primary receiver of the one or more receivers; and
   reducing the tool wave in waveform data associated with the formation wave and the tool wave received by a primary receiver of the one or more receivers.

2. The method of claim 1, wherein the tool wave propagating factor indicates a slowness and attenuation of the tool wave.

3. The method of claim 1, wherein the propagated waveform data associated with each receiver represents an inverse of the tool wave.

4. The method of claim 1, further comprising weighting an amplitude of the propagated waveform data associated with a given receiver of the one or more receivers.

5. The method of claim 1, wherein propagating the waveform data comprises forward or back propagating the waveform data based on a spatial position of the auxiliary receiver with respect to the primary receiver.

6. The method of claim 1, wherein propagating the waveform data comprises adjusting the waveform data by the tool wave propagating factor.

7. The method of claim 1, wherein the primary acoustic wave which causes the tool wave excited by the primary transmitter to be reduced, excites an inverse of the tool wave in the logging tool.

8. A system comprising:
   a logging tool comprising one or more transmitters and one or more receivers, wherein the one or more transmitters and one or more receivers are positioned along a longitudinal axis of the logging tool, and wherein the logging tool comprises a tool wave propagating factor which is different from a formation wave propagating factor;
   a processor;
   a non-transitory machine readable media having program code executable by the processor to cause the processor to:
      transmit, by a primary transmitter of the one or more transmitters positioned along a longitudinal axis of a logging tool, a primary acoustic wave into a geologic formation which excites a tool wave and a formation wave in the geologic formation, wherein the logging tool comprises a tool wave propagating factor which is different from a formation wave propagating factor;
      receive, by one or more receivers positioned along the longitudinal axis of the logging tool, the formation wave and the tool wave;
      propagate waveform data associated with the tool wave and formation wave received by an auxiliary receiver of the one or more receivers based on a distance between the auxiliary receiver and a primary receiver of the one or more receivers; and
      reduce the tool wave in waveform data associated with the formation wave and the tool wave received by a primary receiver of the one or more receivers based on the propagated waveform data.

9. The system of claim 8, wherein the tool wave propagating factor indicates a slowness and attenuation of the tool wave.

10. The system of claim 8, wherein the propagated waveform data associated with each receiver represents an inverse of the tool wave.

11. The system of claim 8, wherein the program code executable by the processor further cause the processor to weigh an amplitude of the propagated waveform data associated with a given receiver of the one or more receivers.

12. The system of claim 8, wherein the program code executable by the processor to cause the processor to propagate the waveform data include instructions for forward or back propagating of the waveform data based on a spatial position of the one or more receivers with respect to the primary receiver.

13. The system of claim 8, wherein the program code executable by the processor to cause the processor to propagate the waveform data include instructions to adjust the waveform data by the tool wave propagating factor.

14. The system of claim 8, wherein the primary acoustic wave which causes the tool wave excited by the primary transmitter to be reduced, excites an inverse of the tool wave in the logging tool.

* * * * *